United States Patent

Tsubouchi

[11] Patent Number: 5,704,270
[45] Date of Patent: Jan. 6, 1998

[54] VACUUM BRAKE BOOSTER FOR AUTOMOTIVE VEHICLE

[75] Inventor: Kaoru Tsubouchi, Toyota, Japan

[73] Assignee: Aisin Seiki Kabushiki Kaisha, Kariya, Japan

[21] Appl. No.: 649,541

[22] Filed: May 17, 1996

[30] Foreign Application Priority Data

May 18, 1995 [JP] Japan ................................. 7-120203

[51] Int. Cl.$^6$ ....................................................... F15B 9/10
[52] U.S. Cl. ........................................................ 91/376 R
[58] Field of Search ............................................ 91/376 R

[56] References Cited

U.S. PATENT DOCUMENTS

| 4,005,638 | 2/1977 | Takeuchi | 91/376 R |
| 4,598,625 | 7/1986 | Belart | 91/376 R |
| 5,546,846 | 8/1996 | Bauer | 91/376 R |
| 5,601,008 | 2/1997 | Miwa et al. | |

FOREIGN PATENT DOCUMENTS

| 42 27 879 | 2/1994 | Germany . |
| 4-24869 | 2/1992 | Japan . |
| 8-113137 | 5/1996 | Japan . |
| 2 294 100 | 4/1996 | United Kingdom . |

Primary Examiner—F. Daniel Lopez
Attorney, Agent, or Firm—Burns, Doane, Swecker & Mathis, LLP

[57] ABSTRACT

In a vacuum brake booster including a housing the interior of which is subdivided into negative and variable pressure chambers by means of a movable wall assembled therein, a piston body assembled with the movable wall to be axially movable in the housing, a valve plunger axially slidably coupled within the piston body, a first annular valve element formed on an outer end of the valve plunger, a second valve element formed on an internal cylindrical portion of the piston body, and a control valve assembly having a first annular sealing portion cooperable with the first valve element and a second annular sealing portion united with the first annular sealing portion to cooperate with the second valve element, the first valve element is arranged in a position spaced in an axial direction from the first valve element, and the first and second annular sealing portions of the control valve assembly are spaced in the axial direction to cooperate with the first and second valve elements.

4 Claims, 3 Drawing Sheets

VACUUM BRAKE BOOSTER FOR AUTOMOTIVE VEHICLE

BACKGROUND OF THE INVENTION

1. Field of the Invention

The present invention relates to a vacuum brake booster adapted for use in a braking system of an automotive vehicle.

2. Description of the Related Prior Art

Disclosed in Japanese Patent Laid-open Publication No. 4 (1992)-24869 is a vacuum brake booster which includes a housing the interior of which is subdivided into a negative pressure chamber and a variable pressure chamber by means of a movable wall assembled therein; a piston body assembled with the movable wall to be axially movable in the housing, the piston body having an internal cylindrical portion integrally formed therein and a rear cylindrical portion extending outwardly from the housing; a valve plunger axially slidably coupled within the internal cylindrical portion of the piston body concentrically therewith; input push rod connected to the valve plunger and extending outwardly from an outer end of the rear cylindrical portion of the piston body; a first annular valve element integrally formed on an outer end of the valve plunger; a second annular valve element integrally formed on shoulder of the internal cylindrical portion of the piston body; a control valve assembly having an annular sealing portion respectively cooperable with the first and second annular valve elements for controlling a communication of the variable pressure chamber with the atmospheric air and for controlling a communication between the variable pressure chamber and negative pressure chamber, a bellows portion integrally formed at one end thereof with the annular sealing portion and fixed at the other end thereof to an internal surface of the rear cylindrical portion of the piston body, the bellows portion being arranged in surrounding relationship with the input push rod; first resilient means for biasing the annular sealing portion of the control valve assembly toward he first and second annular valve elements second resilient means for biasing the input push rod in such a manner as to engage the annular sealing portion of the control valve assembly with the first valve element in a released condition of the brake booster and to separate the annular sealing portion of the control valve assembly from the second valve element; means for restricting axial displacement of the valve plunger relative to the piston body in a predetermined amount; and a reaction mechanism provided within the piston body for applying a reaction force to the valve plunger in accordance with a forward force caused by a difference in pressure between the negative pressure chamber and variable pressure chamber.

In the conventional vacuum brake booster described above, the second annular valve element is spaced from the first annular valve element in a radial direction to from an annular passage, and the effective diameter of the bellows portion of the control valve assembly is determined larger than the sealing diameter of the first annular valve element.

Since in such an arrangement of the annular valve elements, the annular passage is formed between the annular valve elements, it is difficult to enlarge the sealing diameter of the first annular valve element in relation to the second annular valve element. For this reason, a sufficient passage area for the air passage may not be provided between the first annular valve element and the annular sealing portion of the control valve assembly, resulting in deterioration of operative response of the brake booster. In the vacuum brake booster, it is also required to determine the biasing force of the second resilient means in such a manner as to retain the valve plunger and input push rod in position against a pressure acting on a difference between pressure receiving areas of the first annular valve element and the bellows portion of the control valve. For this reason, it is difficult to reduce an initial load acting on the brake booster.

SUMMARY OF THE INVENTION

It is, therefore, a primary object of the present invention to provide a vacuum type brake booster capable of enhancing operative response in braking operation and of reducing an initial load acting thereon.

According to the present invention, the object is accomplished by providing a vaccum brake booster for automotive vehicles, which includes a housing the interior of which is subdivided into a negative pressure chamber and a variable pressure chamber by means of a movable wall assembed therein; a piston body assembled with the movable wall to be axially movable in the housing, the piston body having an internal cylindrical portion integrally formed therein and a rear cylindrical portion extending outwardly from the housing; a valve plunger axially slidably coupled within the internal cylindrical portion of the piston body concentrically therewith; an input push rod connected to the valve plunger and extending outwardly from an outer end of the rear cylindrical portion of the piston body; a first annular valve element integrally formed on an outer end of the valve plunger; a second annular valve element integrally formed with the internal cylindrical portion of the piston body; a control valve assembly having a first annular sealing portion cooperable with the first annular valve element for controlling a communication of the variable pressure chamber with the atmospheric air, a second annular sealing portion united with the first annular sealing portion to cooperate with the second valve element for controlling a communication between the variable pressure chamber and negative pressure chamber, a bellows portion integrally formed at one end thereof with the first annular sealing portion and fixed at the other end thereof to an internal surface of the rear cylindrical portion of the piston body, the bellows portion being arranged in surrounding relationship with the input push rod; first resilient means for biasing the first and second annular sealing portions of the control valve assembly toward the first and second annular valve elements; second resilient means for biasing the input push rod in such a manner as to engage the first annular sealing portion of the control valve assembly with the first valve element in a released condition of the brake booster and to separate the second annular sealing portion of the control valve assembly from the second valve element; means for restricting axial displacement of the valve plunger relative to the piston body in a predetermined amount; and a reaction mechanism provided within the piston body for applying a reaction force to the valve plunger in accordance with a forward force caused by a difference in pressure between the negative pressure chamber and variable pressure chamber; wherein the first annular valve element is arranged in a position spaced from the second annular valve element in an axial direction, and wherein the first and second annular sealing portions of the control valve assembly are spaced in the axial direction to cooperate with the first and second valve elements.

In the foregoing arrangement of the annular valve elements, the sealing diameter of the first valve element can be enlarged without any restriction caused by the provision of the second valve element, and an air passage formed between the first annular valve element and the first annular sealing portion of the control valve assembly can be formed to provide a sufficient passage area thereby to enhance operative response of the brake booster in braking operation. In a practical embodiment of the present invention, it is preferable that an effective diameter of the bellows portion of the control valve assembly is determined to be substantially the same as the sealing diameter of the first annular valve element. With such an arrangement, it is able to reduce a difference between pressure receiving areas of the bellows portion and first annular valve element in an inoperative condition as small as possible thereby to minimize a thrust force acting on the first annular sealing portion of the control valve assembly. As a result, the load of the second resilient means for retaining the valve plunger and input push rod in their inoperative conditions can be decreased to reduce an initial load applied to the brake booster.

BRIEF DESCRIPTION OF THE DRAWINGS

Additional objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
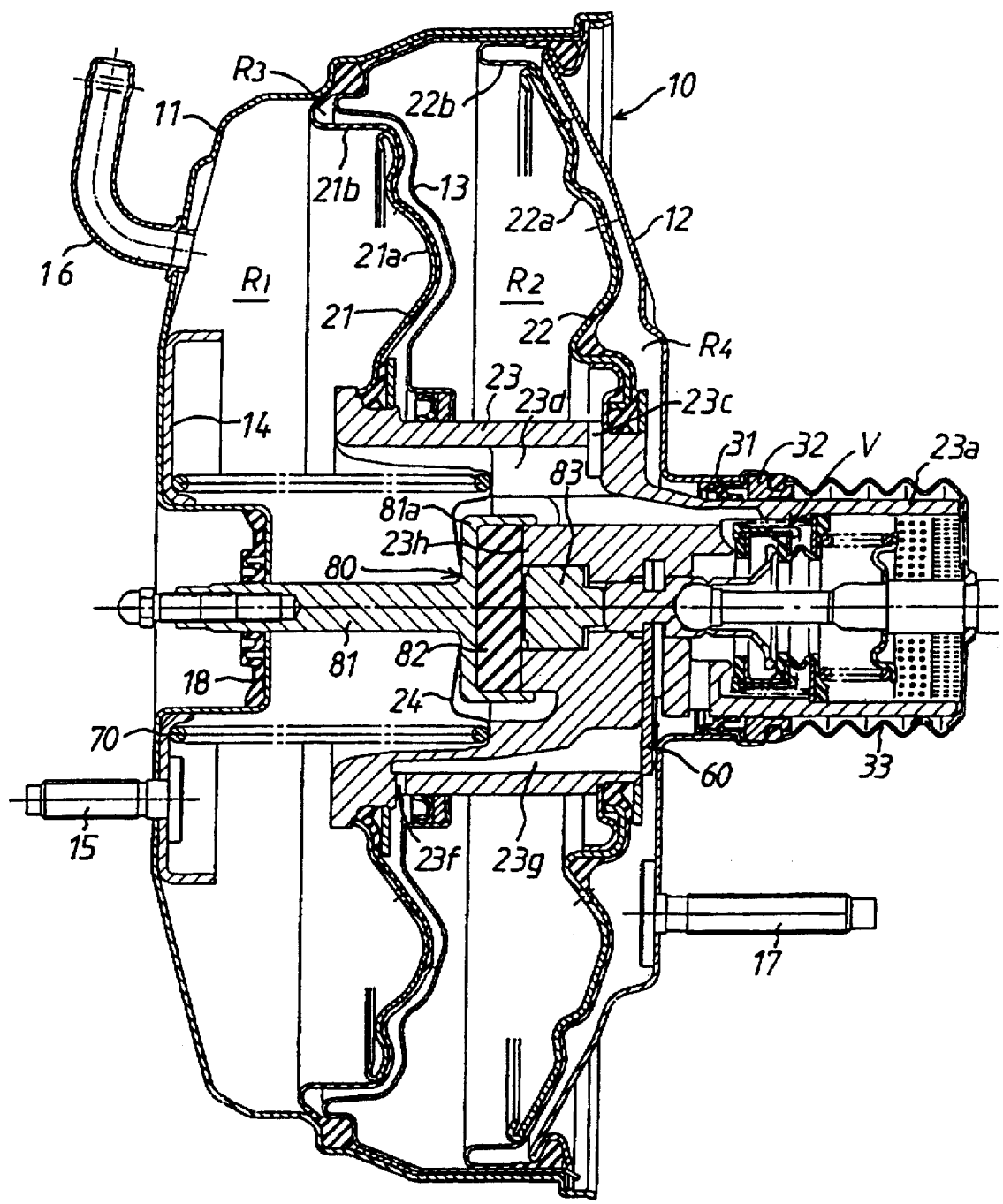
FIG. 1 is a sectional view of a tandem-type vacuum brake booster in accordance with the present invention.

Referring now to the drawings, FIG. 1 illustrates a tandem-type vacuum brake booster for an automotive vehicle in accordance with the present invention. A housing assembly 10 of the brake booster includes front and rear housing shells 11 and 12 coupled at their opposed annular ends with each other in an air-tight manner. The interior of housing assembly 10 is subdivided into negative pressure chambers R1, R2 and variable pressure chambers R3, R4 by means of a partition wall member 13 and front and rear movable walls 21, 22. The partition wall member 13 is coupled at its outer cylindrical portion with the inner wall of front housing shell 11 in an air-tight manner and at its inner peripheral portion with a cylindrical piston body 23. The front housing shell 11 is reinforced by an annular reinforcement plate 14 secured to its inner wall, and a plurality of bolts 15 are fixed in an air-tight manner to the reinforcement plate 14 for connection to a master cylinder (not shown). A connector 16 is mounted in an air-tight manner on an upper portion of front housing shell 11 for connection to an intake manifold (not shown) of an internal combustion engine of the vehicle. The rear housing shell 12 is provided with a plurality of bolts 17 fixed to its central flat portion in an air-tight manner for mounting the brake booster on a dash panel (not shown) of the vehicle.

The front movable wall 21 is composed of an annular support plate 21a and a diaphragm member 21b. The annular support plate 21a is coupled at its inner peripheral portion with an annular outward flange formed on the front end of cylindrical piston body 23. The diaphragm member 21b is attached to the rear face of annular support plate 21a and has an inner peripheral bead coupled with an annular shoulder of cylindrical piston body 23 and an outer peripheral bead interposed in an air-tight manner between intermediate annular stepped portions of front housing shell 11 and partition wall member 13. The rear movable wall 22 is composed of an annular support plate 22a and a diaphragm member 22b. The annular support plate 22a is fixedly coupled at its inner peripheral portion with an intermediate annular stepped portion of cylindrical piston body 23. The diaphragm 22b is attached to he rear face of annular support plate 22a and has an inner peripheral bead coupled with the intermediate annular stepped portion of cylindrical piston body 23 in an air-tight manner and an outer peripheral bead interposed in an air-tight manner between the opposed annular ends of front and rear housing shells 11 and 12. The cylindrical piston body 23 has a cylindrical portion 23a of small diameter which extends outwardly from the housing assembly 10 through an annular seal member 31 and an annular bush 32. The cylindrical portion 23a of small diameter is covered with a boot 33 of elastomeric material coupled thereon. A compression coil spring 70 is engaged at its one end with the reinforcement plate 14 and at its other end with the cylindrical piston body 23 through an annular retainer 24 to bias the cylindrical piston body 23 rearward. The cylindrical piston body 23 is provided therein with a valve mechanism V at its cylindrical portion 23a of small diameter and a reaction mechanism 80 at its front portion.

Figure 2:
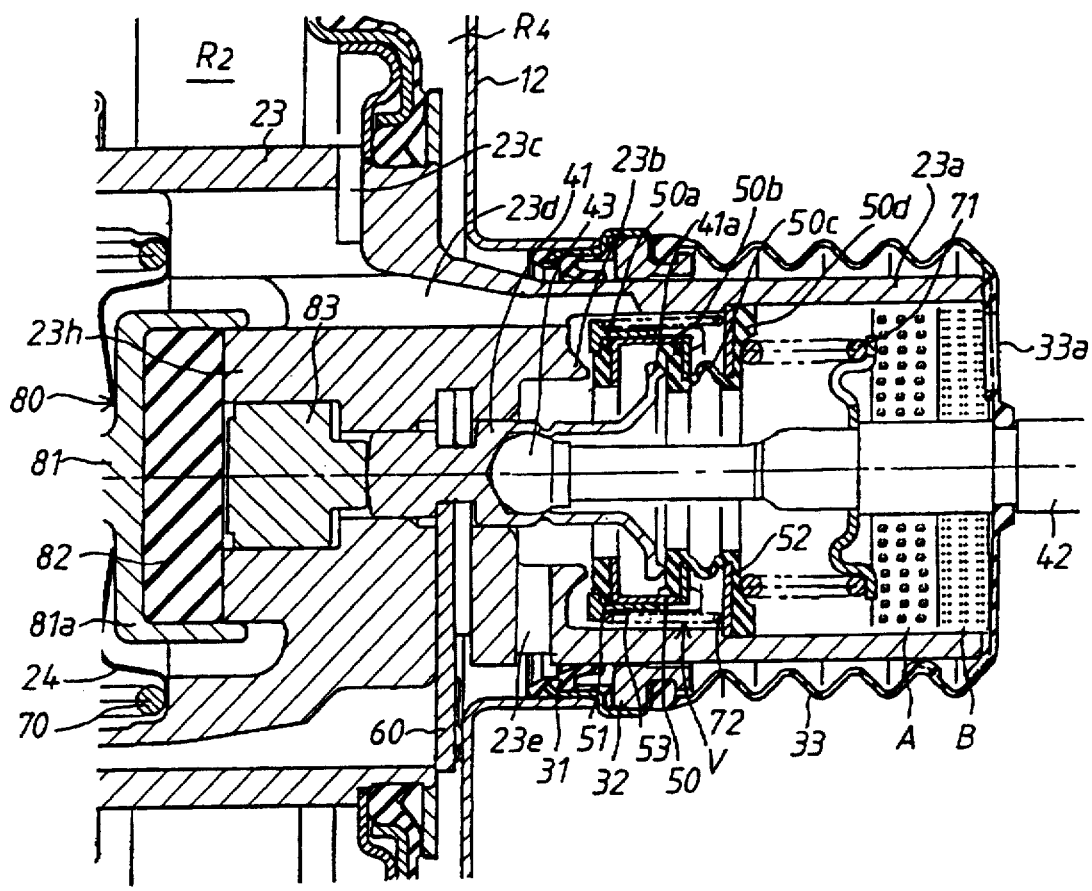
FIG. 2 is a partly enlarged sectional view of the vacuum brake booster shown in FIG. 1.

The valve mechanism V is constructed to selectively communicate the variable pressure chambers R3, R4 with the negative pressure chambers R1, R2 or the atmospheric air. As clearly shown in FIG. 2, the Valve mechanism V includes an annular valve element 41a integrally formed with the rear end of a valve plunger 41 for control of the atmospheric air, an annular valve element 23b integrally formed on an internal annular stepped portion of cylindrical piston body 23 for control of the negative pressure, and a control valve assembly 50 mounted within the rearward cylindrical portion 23a of piston body 23 to cooperate with the annular valve elements 41a and 23b. The valve plunger 41 is axially slidably disposed within the cylindrical piston body 23 and connected to a spherical joint 43 of an input push rod 42 to be moved by depression of a brake pedal (not shown). The axial displacement amount of the valve plunger 41 relative to the cylindrical piston body 23 is defined in a predetermined mount. The input push rod 42 is loaded backward by means of a compression coil spring 71 engaged with the control valve assembly 50.

The control valve assembly 50 includes a front annular sealing portion 50a opposed to the valve element 23b for control of the negative pressure and a rear annular sealing portion 50b opposed to the valve element 41a for control of the atmospheric air. The control valve assembly 50 further includes an intermediate bellows portion 50c integrally formed at one end thereof with an annular mounting portion 50d fixed to the internal surface of the cylindrical portion 23a of small diameter of piston body 23 and at the other end thereof with the rear annular sealing portion 50b. The bellows portion 50c is formed in the same diameter as the valve element 41a to be expanded or contracted in an axial direction. The control valve assembly 50 is composed of a first valve member in the form of a cylindrical body having an inward flange secured to the sealing portion 50a by vulcanization, a second valve member 52 composed of a cylindrical body having the sealing portion 50b, bellows portion 50c and mounting portion 50d, a front annular plate secured to the sealing portion 50b and a rear annular reinforcement plate secured to the mounting portion 50d by vulcanization, and a third valve member 53 in the form of an annular member formed at its front end with an annular stepped portion engaged with an outer periphery of the sealing portion 50a and engaged with the front end of a compression coil spring 72. The third valve member 53 has a plurality of resilient hooks which are radially outwardly expandable and engaged with the front annular plate of the second valve member 52. The sealing portions 50a and 50b united with each other are loaded toward the valve elements 23b and 41a by means of the compression coil spring 72 between the second and third valve members 52 and 53 to be selectively engaged with the valve element 23b or 41a in response to axial movement of the push rod 42.

In the brake booster, a key member 60 is assembled with the cylindrical piston body 23 to retain the valve plunger 41 in position. In an inoperative condition where the key member 60 is in engagement with the rear housing shell 12, the valve element 41a for control of the atmospheric air is maintained in engagement with the rear sealing portion 50b of control valve assembly 50 while the front sealing portion 50a of control valve assembly 50 is separated in a predetermined distance from the valve element 23b for control of the negative pressure to establish a communication between the negative pressure chamber R2 and variable pressure chamber R4 through a radial through hole 23c, an axial passage 23d and a radial through hole 23e formed in the cylindrical piston body 23. When applied with a depression force in operation of the brake pedal, the input push rod 42 and valve plunger 41 are moved against the coil spring 71 so that both the sealing portions 50a, 50b of control valve assembly 50 are moved by the biasing force of coil spring 72 forward. In such an instance, the front sealing portion 50a of control valve assembly 50 is brought into engagement with the valve element 23b for control of the negative pressure, while the rear sealing portion 50b of control valve assembly 50 is separated from the valve element 41a for control of the atmospheric air to establish a communication of the variable pressure chamber R4 with the atmospheric air through the radial through hole 23e in cylindrical piston body 23, an internal space in the control valve assembly 50, air filters A, B and a vent hole 33a of boot 33. Since as shown in FIG. 1, the front negative pressure chamber R1 is constantly communicated with the rear negative pressure chamber R2 through an axial passage 23d and radial through hole 23c in the cylindrical piston body 23 while the front variable pressure chamber R3 is constantly communicated with the rear variable pressure chamber R4 through a radial through hole 23f and an axial passage 23g formed in the cylindrical piston body 23, the front variable pressure chamber R3 is communicated with the atmospheric air when the rear variable pressure chamber R4 is communicated with the atmospheric air.

The reaction mechanism 80 includes an output rod 81 having a rearward cylindrical portion 81a axially slidably coupled with an internal cylindrical portion 23h integrally formed in the cylindrical piston body 23, a rubber cushion disc 82 contained in the rearward cylindrical portion 81a of output rod 81 and engaged with the front end of the internal cylindrical portion 23h, and a spool 83 axially slidably coupled within a stepped bore in the internal cylindrical portion 23h to transmit a reaction force caused by deformation of the rubber cushion disc 82 in operation of the brake booster to the valve plunger 41. The reaction force is defined by a forward force acting on the movable walls 21, 22 caused by a difference in pressure between the negative pressure chambers R1, R2 and variable pressure chambers R3, R4. The front end of output rod 81 extends outwardly from the front housing shell 11 through a seal member 18 to be engaged with a piston in the master cylinder.

Since the valve element 23b for control of the negative pressure in the above embodiment is arranged in a position displaced from the valve element 41a for controlling atmospheric air in an axial direction, the sealing diameter of valve element 41a can be enlarged without any restriction caused by the provision of the valve element 23b for control of the negative pressure. As a result, the air passage formed between the valve element 41a and the sealing portion 50b of control valve assembly 50 can be formed to have a sufficient passage area thereby to enhance operative response of the brake booster in braking operation. In the above embodiment, the effective diameter of the bellows portion 50c of control valve assembly 50 is determined to be substantially equal to the sealing diameter of the valve element 41a for control of the atmospheric air. This useful to reduce a difference between pressure receiving areas of the bellows portion 50c and valve element 41a in an inoperative condition as small as possible thereby to minimize a thrust force acting on the sealing portion 50b of control valve assembly 50. As a result, the load of coil spring 71 for retaining the valve plunger 41 and input rod 42 in their inoperative conditions can be decreased to reduce an initial load applied to the brake booster.

Figure 3:
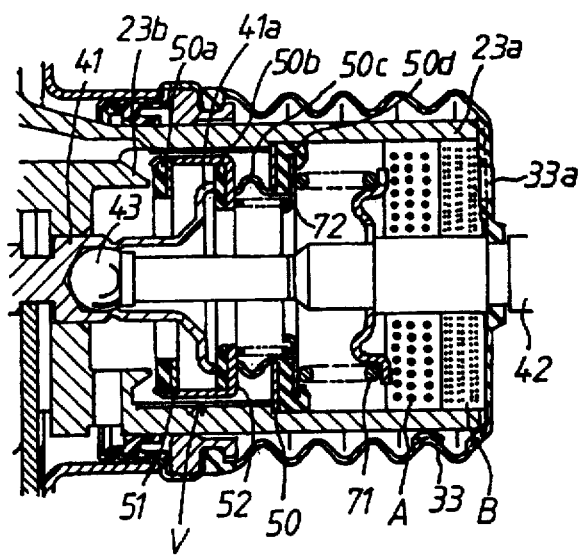
FIG. 3 is a partly enlarged sectional view illustrating a modification of the vacuum brake booster shown in FIG. 1.

Although in the above embodiment, the control valve assembly 50 has been composed of the first valve member 51 integral with the sealing portion 50a, the second valve member 52 integral with the sealing portion 50b, bellows portion 50c and mounting portion 50d and the third valve member 53 connecting the first and second valve members 51 and 52 in an air-tight manner, the control valve assembly 50 may be composed of the first valve member 51 integral with the sealing portion 50a and the second valve member 52 integral with the sealing portion 50b, bellows portion 50c and mounting portion 50d as shown in FIG. 3.

The first valve member 51 in FIG. 3 includes an annular plate integrally secured to the sealing portion 50a by vulcanization. The second valve member 52 includes a first cylindrical body having an inward flange secured to the sealing-portion 50b, a second cylindrical body in the form of the bellows portion 50c and mounting portion 50d, and an annular reinforcement plate secured to the mounting portion 50d by vulcanization. The first valve member 51 is connected with the first cylindrical body of the second valve member 52 at its one end in a condition where it has been coupled with an inner shoulder of the first cylindrical body.

In the modification shown in FIG. 3, the control valve assembly 50 can be constructed in a simple manner by assembling the first valve member 51 with the second valve member 52. Since the coil spring 71 for biasing both the sealing portions 50a and 50b of control valve assembly 50 toward the valve elements 23b and 41a is assembled at the inside of control valve assembly 50, it is able to enlarge the effective diameter of the bellows portion 50c of control valve assembly 50 and each sealing diameter of valve elements 23b, 41a in comparison with those in the above embodiment. As a result, each communication passage formed between the valve elements 23b, 41a and the sealing portions 50a, 50b can be enlarged to enhance operative response of the brake booster in depression or release of the brake pedal.

Figure 4:
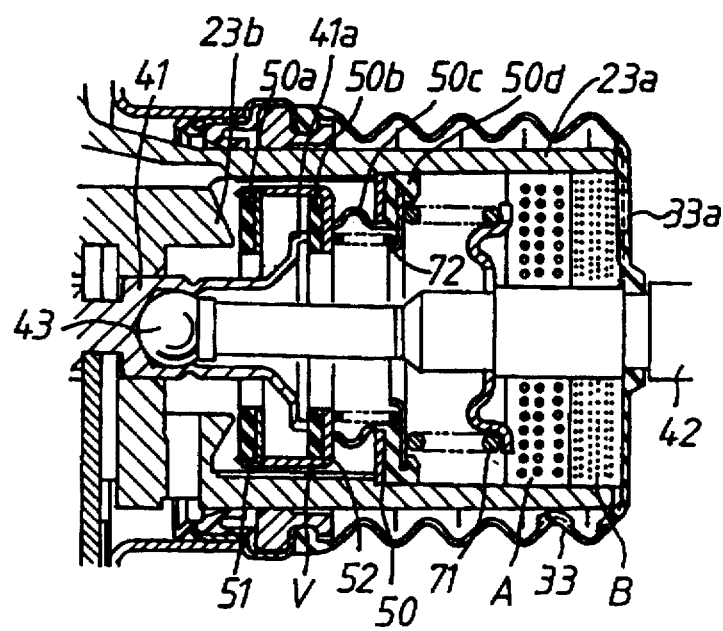
FIG. 4 is a partly enlarged sectional view illustrating another modification of the vacuum brake booster shown in FIG. 1.

Illustrated in FIG. 4 is another modification of the brake booster, wherein the valve element 41a for control of the atmospheric air is formed larger in sealing diameter than the valve element 23b for control of the negative pressure, and wherein the effective diameter of the bellows portion 50c of control valve assembly 50 is made larger than the sealing diameter of the valve element 41a for control of the atmospheric air. With such an arrangement of the valve elements 41a and bellows portion 50c, a different pressure acts on the sealing portions 23b, 41a in accordance with each difference in diameter. This is useful to ensure a more reliable sealing force acting on the valve elements 23b, 41a without increasing the biasing force of coil spring 72.

Figure 5:
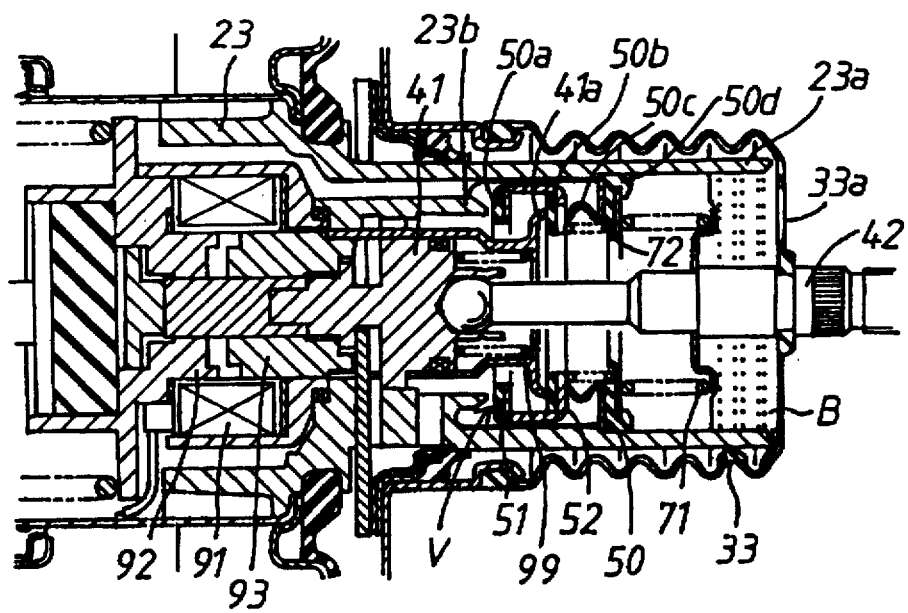
FIG. 5 is a partly enlarged sectional view illustrating a further modification of the vacuum brake booster shown in FIG. 1.

Although in the above embodiment and modifications, the present invention has been adapted to a vacuum brake booster to be operated in response to an input force applied to the input rod 42, the present invention may be adapted to a vacuum brake booster to be operated in response to energization of a solenoid 91 mounted within the cylindrical piston body 23 as shown in FIG. 5. In the brake booster shown in FIG. 5, the valve element 41a for control of the atmospheric air is formed on the distal end of a sleeve member axially slidably coupled with the plunger 41 and loaded by a compression coil spring 99 engaged with the valve plunger 41. In addition, a cylindrical solenoid pluger 93 is provided coaxially with the valve plunger 41 to be attracted toward a stationary core 92 in response to energization of the solenoid 91. The valve mechanism V in the brake booster is substantially the same as that in the embodiment shown in FIG. 3.

Assuming that in operation of the brake booster, the solenoid plunger 93 has been attracted toward he stationary core 92 in response to energization of the solenoid 91, the valve element 41a is moved against the biasing force of coil spring 99 and separated from the sealing portion 50b of control valve assembly 50, while the sealing portion 50a of control valve assembly 50 is brought into engagement with the valve element 23b for control of the negative pressure under action of the coil spring 72. As a result, the variable pressure chambers R3, R4 are isolated from the negative pressure chambers R1, R2 and communicated with the atmospheric air to activate the brake booster.

Although in the above embodiment and modifications, the present invention has been adapted to a tandem-type vacuum brake booster, the present invention may be applied to a single-type or triple-type vacuum brake booster.

What is claimed is:

1. A vacuum brake booster for automotive vehicles, including:

a housing having an interior that is subdivided into a negative pressure chamber and a variable pressure chamber by means of a movable wall;

a piston body assembled with said movable wall to be axially movable in said housing, said piston body having an internal cylindrical portion integrally formed therein and a rear cylindrical portion extending outwardly from said housing;

a valve plunger axially slidably coupled within the internal cylindrical portion of said piston body concentrically therewith;

an input push rod connected to said valve plunger and extending outwardly from an outer end of the rear cylindrical portion of said piston body;

a first annular valve element integrally formed on a rear end of said valve plunger;

a second annular valve element integrally formed with a rear end of the internal cylindrical portion of said piston body;

a control valve assembly having a first annular sealing portion cooperable with said first annular valve element for controlling communication of the variable pressure chamber with the atmosphere, a second annular sealing portion united with said first annular sealing portion to cooperate with said second valve element for controlling communication between the variable pressure chamber and the negative pressure chamber, and a bellows portion, the bellows portion having one end integrally formed with said first annular sealing portion and another end fixed to an internal surface of the rear cylindrical portion of said piston body, said bellows portion being arranged in surrounding relationship with said input push rod;

first resilient means for biasing said first and second annular sealing portions of said control valve assembly toward said first and second annular valve elements;

second resilient means for biasing said input push rod in such a manner as to engage said first annular sealing portion of said control valve assembly with said first valve element in a released condition of said brake booster and to separate said second annular sealing portion of said control valve assembly from said second valve element;

means for restricting axial displacement of said valve plunger relative to said piston body in a predetermined amount; and a reaction mechanism provided within said piston body for applying a reaction force to said valve plunger in accordance with a forward force caused by a difference in pressure between the negative pressure chamber and the variable pressure chamber;

wherein said first annular valve element is located in a position spaced rearwardly from said second annular valve element in an axial direction and is maintained in contact with only said first annular sealing portion of said control valve assembly in the released condition of said brake booster, said first annular valve element being substantially the same in diameter as the second annular valve element, and wherein said first and second annular sealing portions of said control valve assembly are spaced in the axial direction to cooperate with said first and second valve elements.

2. A vacuum brake booster as recited in claim 1, wherein the first annular valve element has a sealing diameter, an effective diameter of the bellows portion of said control valve assembly being substantially the same as the sealing diameter of said first annular valve element.

3. A vacuum brake booster as recited in claim 1, wherein said control valve assembly comprises a cylindrical body formed with a pair of axially spaced annular inward flanges supporting said first and second annular sealing portions which are secured thereto.

4. A vacuum brake booster as recited in claim 3, wherein an outer diameter of the cylindrical body of said control valve assembly is approximately the same as an inner diameter of the rear cylindrical portion of said piston body.

* * * * *